(12) United States Patent
Messalier

(10) Patent No.: US 9,689,992 B2
(45) Date of Patent: Jun. 27, 2017

(54) METHOD AND DEVICE FOR DETERMINING THE RADIOLOGICAL ACTIVITY DEPOSITED IN A SEA BED

(71) Applicant: AREVA NC, Courbevoie (FR)

(72) Inventor: Marc Messalier, Saint Michel D'Euzet (FR)

(73) Assignee: AREVA NC, Courbevoie (FR)

( * ) Notice: Subject to any disclaimer, the term of this patent is extended or adjusted under 35 U.S.C. 154(b) by 9 days.

(21) Appl. No.: 14/770,264

(22) PCT Filed: Feb. 21, 2014

(86) PCT No.: PCT/EP2014/053386
§ 371 (c)(1),
(2) Date: Aug. 25, 2015

(87) PCT Pub. No.: WO2014/128238
PCT Pub. Date: Aug. 28, 2014

(65) Prior Publication Data
US 2016/0018533 A1 Jan. 21, 2016

(30) Foreign Application Priority Data
Feb. 25, 2013 (FR) ...................... 13 51642

(51) Int. Cl.
*G01T 1/16* (2006.01)
*G01T 1/169* (2006.01)
(Continued)

(52) U.S. Cl.
CPC ............. *G01T 1/169* (2013.01); *G01T 1/178* (2013.01); *G01T 7/00* (2013.01)

(58) Field of Classification Search
CPC .................................................... G01T 1/169
See application file for complete search history.

(56) References Cited

U.S. PATENT DOCUMENTS 3,214,586 A * 10/1965 Graham ................. G01N 23/04
250/497.1
3,993,906 A * 11/1976 English ................ G03B 42/028
378/145

(Continued)

FOREIGN PATENT DOCUMENTS

JP 49-005802 A 1/1974
JP 7-128451 A 5/1985

(Continued)

OTHER PUBLICATIONS

International Search Report and Written Opinion for PCT Application No. PCT/EP2014/053386 dated May 28, 2014.

(Continued)

*Primary Examiner* — Edwin Gunberg
(74) *Attorney, Agent, or Firm* — Nixon Peabody LLP; Khaled Shami

(57) ABSTRACT

A device for measurement of the radiological activity in the bottom of an aqueous medium, comprising a sealed case for a radiological detector, means forming a truncated cone containing a material that allows radiation to be measured by said radiological detector to pass through it, comprising a short base and a long base, the long base forming an input face for the radiation to be measured, this cone being assembled to said case in a sealed manner, the short base being placed on the side of the detector input face, and the long base being designed to be placed facing the bottom of this aqueous medium.

20 Claims, 8 Drawing Sheets

(51) Int. Cl.
*G01T 7/00* (2006.01)
*G01T 1/178* (2006.01)

(56) References Cited

U.S. PATENT DOCUMENTS

| | | | |
|---|---|---|---|
| 4,814,608 A | 3/1989 | Dempsey et al. | |
| 5,218,208 A | 6/1993 | Augier et al. | |
| 5,419,395 A * | 5/1995 | Harvey | E21B 47/01 |
| | | | 166/241.6 |
| 6,484,660 B1 | 11/2002 | English | |
| 2006/0269042 A1* | 11/2006 | Muhanna | G01V 5/0016 |
| | | | 378/57 |
| 2011/0077799 A1 | 3/2011 | Barnes et al. | |
| 2015/0373822 A1* | 12/2015 | Churchman | G01N 23/04 |
| | | | 378/59 |

FOREIGN PATENT DOCUMENTS

| | | |
|---|---|---|
| JP | 1-285888 A | 11/1989 |
| JP | 8-271636 A | 10/1996 |
| JP | 10-332873 A | 12/1998 |
| JP | 2003-329776 A | 11/2003 |
| JP | 2008-058113 A | 3/2008 |

OTHER PUBLICATIONS

Preliminary Search Report for France Application No. 13 51642 dated Oct. 18, 2013.
International Preliminary Report on Patentability for PCT Application No. PCT/EP2014/053386 dated Jun. 10, 2015.
JP Office Action dated Nov. 21, 2016, 4 pages (including translation).

* cited by examiner

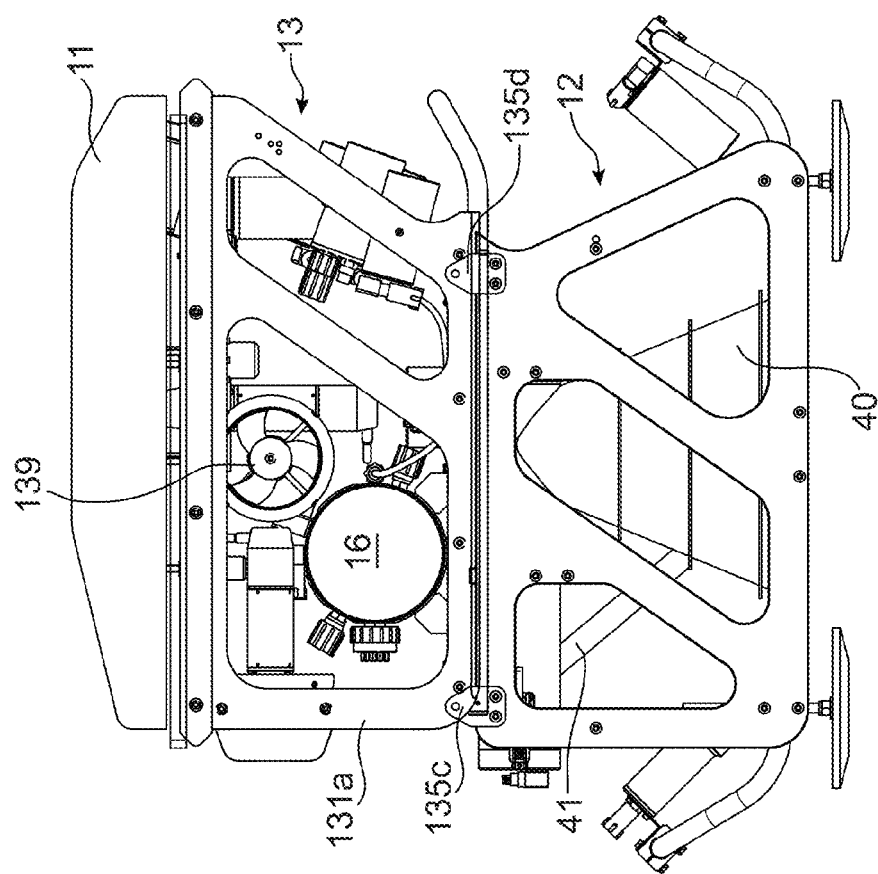
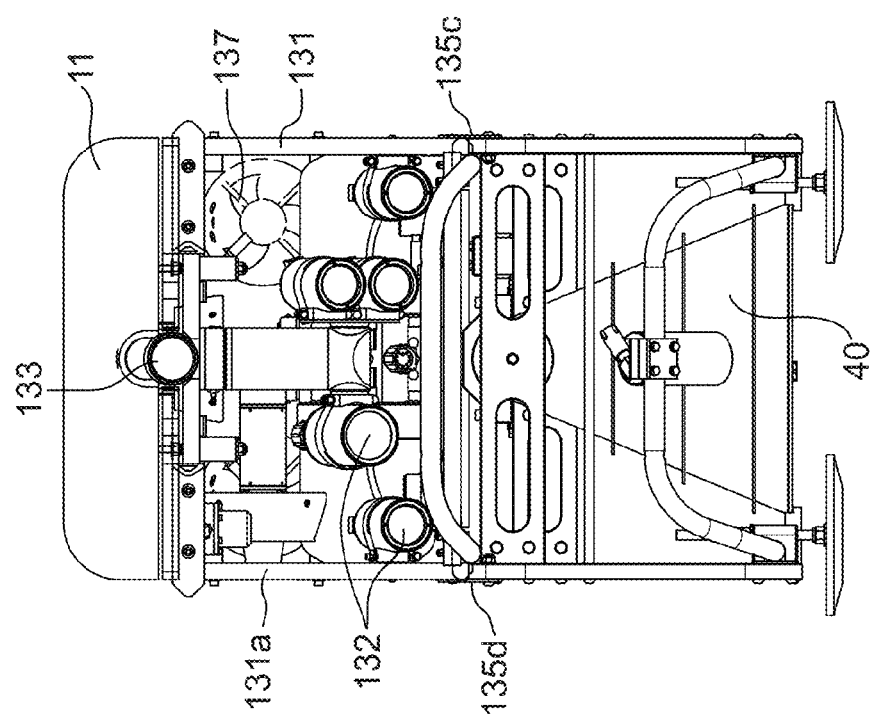
FIG.8A
FIG.8B

METHOD AND DEVICE FOR DETERMINING THE RADIOLOGICAL ACTIVITY DEPOSITED IN A SEA BED

CROSS-REFERENCE TO RELATED PATENT APPLICATION

The present application is a National Stage Application of International Application No. PCT/EP2014/053386 entitled "METHOD AND DEVICE FOR DETERMINING THE RADIOLOGICAL ACTIVITY DEPOSITED IN A SEA BED" filed Feb. 21, 2014, which claims priority to French Patent Application Number 13 51642 filed Feb. 25, 2013, the contents of which are incorporated herein by reference in their entirety.

TECHNICAL FIELD AND PRIOR ART

The invention relates to a method and a system designed to determine the radiological activity deposited in bottom sediments in an aqueous medium, for example at the bottom of lakes, or on a sea bed or a river bed, but also at the bottom of an estuary, or a storage pool on a nuclear site.

For example, it may be required to determine the radiological activity deposited in bottom sediments of such an aqueous medium, and to determine the gamma spectrum of these bottom sediments.

In a case of a major nuclear accident, radionuclides escape from the reactor and combine with "clay" type natural elements forming relatively stable complexes in the long term. This phenomenon is particularly important in the case of Cs 134 and 137 that according to the accident scenario, are usually the only significant radioelements remaining a few months after the accident. Clay particles are naturally drained by water during storms and therefore are concentrated in sedimentary zones of lakes, rivers and estuaries into which tributaries carrying contaminated water flow.

This contamination is difficult or even impossible to measure over depths exceeding a few meters and/or in cloudy water using usual means, for example of the type making use of a rod fitted with a gamma detector at one of its ends.

Several technical problems arise in making this measurement.

A first problem is making measurements at depths exceeding 5 m (and up to about 1000 m). Therefore, an attempt is made to limit attenuation due to the water thickness between the probe and the detector in order to have thresholds and detection limits compatible with realistic counting times (of the order of a hundred seconds per measurement point) with satisfactory statistical precision.

Another problem is to be able to position the probe relative to the bottom without disturbing sediments, to avoid the measurement error related to the suspension of sediments in water generating a parasite count.

Another problem is to be able to guarantee precision and reproducibility of the position of the measurement points, preferably to the nearest meter, so that surfaces to be treated can be located and changes to bottom sediments can be monitored.

Therefore, a new device and a new measurement method are required to determine or estimate the radiological activity deposited in bottom sediments in an aqueous medium.

Another purpose of the invention is to detect any gamma emitting radio-element.

Preferably, such a device and such a method are capable of solving all or some of the above problems.

PRESENTATION OF THE INVENTION

The invention relates firstly to a device for measurement of the radiological activity in a sea bed, comprising a sealed case for a radiological detector, means forming a volume, for example a truncated cone containing a material that allows radiation to be measured by said radiological detector to pass through it, this volume being provided with an input face for the radiation to be measured, this volume or this truncated cone being assembled to said case in a sealed manner.

In the case of the truncated cone, the truncated cone comprises a short base and a long base, the long base forming said input face of the radiation to be measured. The short base is placed on the side of the detector input face, and the long base being designed to be placed facing the sea bed.

The detector input face is preferably located outside the volume of the truncated cone, on the same side as or above its short base.

The detector can be mounted vertically or horizontally.

Said material through which radiation to be measured can pass may be a gas (for example air) or a low density solid material that traps said gas. For example, it may be a polyurethane foam.

The radiation input face, for example the long base of the truncated cone, is preferably closed, for example by a plate, also for example of the type that comprises means defining an opening or a central zone through the plate; these means for example comprise a tubular portion arranged approximately perpendicular to the long base or to said input face, or said zone is defined by a tubular portion arranged approximately perpendicular to the long base or to said input face, ribs extending radially connecting the tubular portion and said plate or the long base.

Preferably, the angle of the truncated cone is between 15° and 75°, for example it is 60°.

The case may extend along an axis approximately perpendicular to the axis of revolution of the truncated cone.

The invention also relates to a system for measurement of the radiological activity at the bottom of an aqueous medium comprising:

a frame that will be immersed in said aqueous medium,
a measurement device like that described above.

Advantageously, the system is fitted with means of illuminating the aqueous medium and the bottom of this aqueous medium.

The frame preferably comprises perforated side walls. It may comprise means of positioning the system on the bottom of an aqueous medium.

The frame may comprise means of removably fixing the measurement device relative to the frame.

Means may be provided to estimate a position of the frame relative to the sea bed, for example sonar.

Means may be provided to produce a map of the radiological activity of the sea bed.

At least one camera can be used to film the aqueous medium and the bottom of this aqueous medium.

The frame may comprise means of displacing the measurement device relative to the frame.

Such a system may be associated with or may comprise a remote-controlled vehicle to enable displacement of the frame and detection means in the aqueous medium. This vehicle may also itself comprise means of lighting and/or at least one camera.

The invention also relates to a method of measuring the radiological activity in a bottom of an aqueous medium comprising:

introduction of a device or system like that described above, in the aqueous medium, measurement of the radiological activity using the measurement device, the long base of the truncated cone being brought close to the bottom of the aqueous medium.

The method may also comprise production of a map of the radiological activity of the bottom of the aqueous medium.

The system may be introduced such that the long base of the truncated cone is brought to less than 1 m from the bottom of the aqueous medium.

The bottom of the aqueous medium may be at a depth of between 5 m and 100 m, or even more than 100 m.

The aqueous medium may be a lake, or a sea or a river, or an estuary, or even a storage pool on a nuclear site, or a sedimentary retention zone.

BRIEF DESCRIPTION OF THE DRAWINGS

FIGS. 8A-8B show different views of a system according to the invention, fixed onto a remote-controlled submarine vehicle.

DETAILED PRESENTATION OF PARTICULAR EMBODIMENTS

Figure 1A:
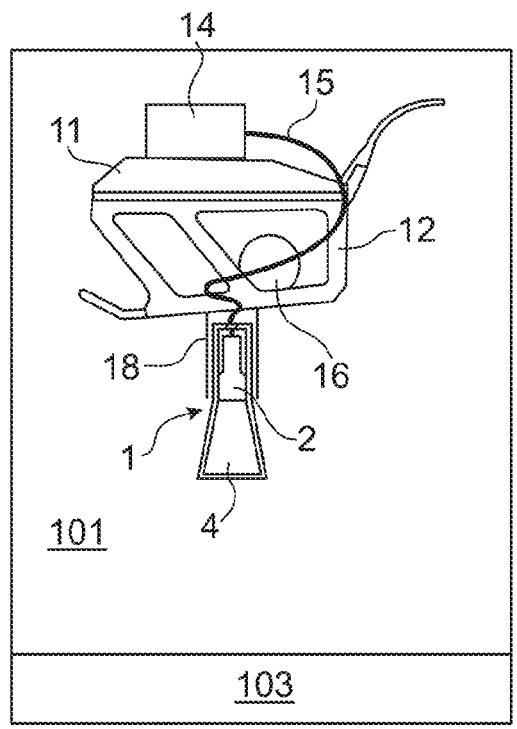
FIGS. 1A and 1B diagrammatically show a measurement system according to the invention.
Figure 1B:
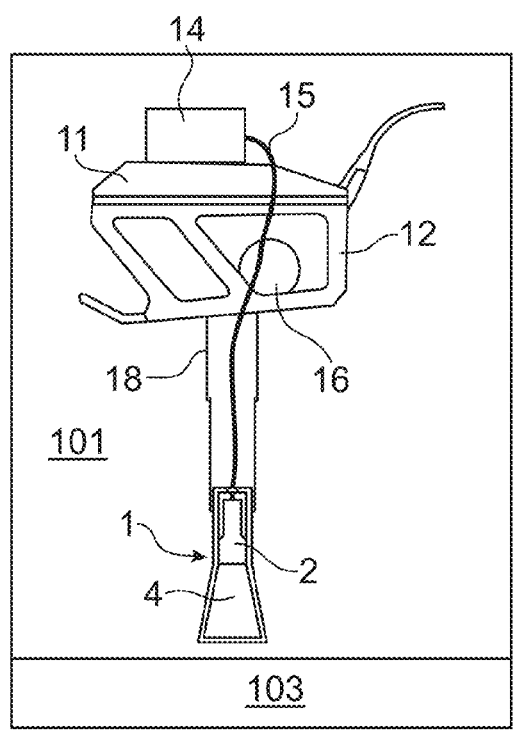

FIGS. 1A and 1B diagrammatically show a system for measurement of the radiological activity in a bed 103 of an aqueous medium 101.

This system comprises a chassis or a frame 12 that brings a radiological activity measurement probe 1 close to the bed 103.

This measurement device 1 comprises a radiological detector 2 associated with a volume 4 filled with a gas such as air that will eliminate a large part of the attenuation related to the presence of water in the aqueous medium 101. A gas other than air could be used. As a variant, a low density solid material, preferably with an apparent density less than 0.1 g·cm$^{-3}$ could be used, such as polyurethane foam containing trapped air or gas.

The dimensions of this volume 4 are chosen to give reasonable detection limits for a given type of detector 2, for example provided with 3 inch crystals. Preferably, this volume is in a shape of a truncated cone, between a short base and a long base, the short base facing the detector 2 and the long base being designed to face the surface of the bed 103.

In the case of a truncated cone, also preferably, the dimension of the short base of the cone is preferably calculated such that the entire detector 2 is in direct view of the source. The input face of the detector can see the entire source or the entire area defined by the long base of the cone.

The detector input face may be located outside the volume of the truncated cone, at the side of or above its short base.

The distance between the detector and the short base of the truncated cone, for example the distance between the input face of this detector and said short base, may vary from a few mm (for example 5 mm or 10 mm) to a few centimeters (for example 5 cm or 8 cm); this distance will be varied as a function of the selected fabrication and the choice of the detector position (vertically or horizontally).

An example of a horizontal installation is described below with reference to FIGS. 5A, 6A and 6B below. In a horizontal type installation, the detector extends along an axis perpendicular or approximately perpendicular to the axis of the cone (or the volume containing a material through which radiation to be measured by the detector passes), that is vertical or approximately vertical in the working position.

An example of a vertical installation is described below with reference to FIG. 4B or above with reference to FIGS. 1A-1B. In a vertical type installation, the detector is located on or extends along the same axis (vertical in the working position) as the cone (or the volume containing a material through which a radiation to be measured by the detector passes).

The detector 2 is a gamma radiation detector, for example of the NaI, or Ge or LaBr type. The size of the detector may vary from a few millimeters (for example in the case of a CZT) to 3 inches. In the case of a detector in the form of a straight cylinder, its diameter is equal to its height, for example also 3 inches.

The frame 12 may be provided with means 16, 18 comprising particularly at least one motor 16 that may for example be electrical or hydraulic, and means 18 of lowering and raising the device 1 that will bring the assembly forming the measurement device 1 close to the surface of the bed 103.

The frame 12 may be fixed on an off-the-shelf remote controlled submarine vehicle 13 (one implementation of which is described later in relation with FIGS. 8A-8B), otherwise called a ROV (Remotely Operated Vehicle), like those marketed by the ECA HYTEC Company.

The assembly comprising the ROV and the frame may also be fitted with means 14 connected to the measurement device 1 through a conduit 15 to circulate a cooling fluid, for example liquid nitrogen, designed to cool the detector 2, for example when it is made of germanium. As a variant, the germanium detector may be fitted with an electric cryostat. As shown in FIGS. 1A and 1B, these means 14 may be placed on a cover 11 that contains the rest of the system.

The assembly comprising the ROV and the frame is balanced so that it preferably has an apparent weight almost equal to zero in the aqueous medium.

Motors are fitted on the ROV so that the equipment can be positioned in its medium. These motors are denoted as references 137, 139 in FIGS. 8A and 8B.

The frame may be fitted with pads (references 129a to 129d in FIGS. 5A-5B), thus enabling placement on the bottom if possible depending on the density of the sediments. Preferably, means (references 109a to 109d in FIGS. 5A-5B) are used to adjust the height of these pads.

The measurement device 1 comprises a cone or a truncated cone, preferably metallic, designed to resist pressure as a function of the required depth. Information about this cone, that is preferably a truncated cone, has already been given above. The long (or large) base of this cone or the flat bottom 42a that closes off the truncated cone on the side of the medium to be explored (sea bed) may be reinforced (see FIG. 7) by ribs 420 to 427 placed perpendicular to its surface and extending radially to connect a central tubular portion 46 and the plate 42a in order to limit its metallic thickness that hinders the detection of gamma radiation.

The thickness, the shape, the position and the number of ribs may be determined as a function of the pressure applied by the water on the cone, and therefore the required depth.

For example, a 6 mm steel plate may be sufficient up to a depth of about 800 m, instead of the 12 mm normally required.

For example, for a depth of 100 m, the increase in pressure requires an increase in the bottom thickness of the order of 6 mm of steel; such a thickness would attenuate gamma radiation from $^{137}$Cs by a factor of the order of 2 (loss of about 50%), while less than 5% of the detection will be lost if ribs are used.

The frame may also be fitted with a device such as a sonar and/or illumination means and/or cameras to position and/or detect and/or display the aqueous medium and the bed 103.

Thus, the approach towards the bottom may be assisted by the use of a sonar and/or by means of a camera, if possible depending on visibility.

In general, it would be possible to:
either bring the measurement device 1 to the required distance from the bed, for example using an actuator,
or bring the measurement device 1 with the ROV 13 carrying the frame 12, the frame being placed a few cm from the sediments to be measured.

The assembly described below (the ROV, the frame and the detection means) can descend to large depths, for example between 1 m and 100 m, or even more than 100 m, and can be stabilised a few centimeters from the bottom of the water.

In one embodiment shown in FIGS. 8A and 8B, the ROV 13 is fitted with the bolted frame 12 supporting the measurement device 1.

This assembly may be associated with means of positioning in space to estimate the position of the system when it is in water.

Figure 2:
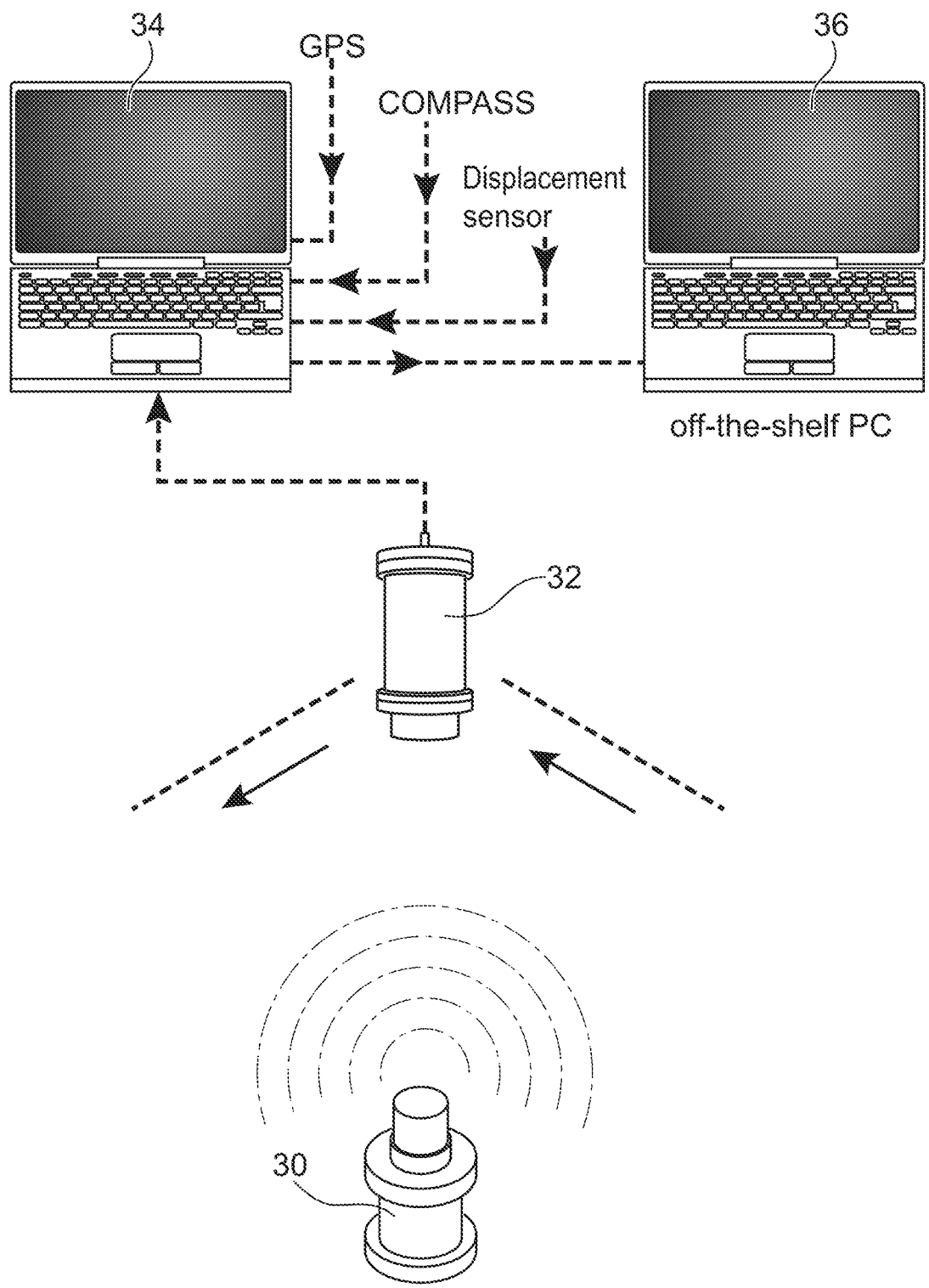
FIG. 2 shows a data reception system and means of processing the data measured using a device according to the invention.

Thus, it may comprise an underwater positioning system, for example a large angle USBL (Ultra Short Baseline) type system, that can be coupled with a GPS to geo-position the measurement. As shown in FIG. 2, such a positioning system may comprise a transponder 30 that is placed on the frame 12 when it is lowered into the aqueous medium. This transponder communicates in emission and in reception with a transceiver 32 placed on the surface, for example onboard a boat or on land. This transceiver will transmit positioning data and/or data measured using the detector device 2, to data reception, processing and storage means 34. Preferably, these means 34 will be a microcomputer or a portable computer. These means 34 may be connected to positioning means, such as GPS or compass or displacement sensors to identify the position of the detection system 12, 2, 4 when it is in an aqueous medium.

In turn, these means 34 may be connected to or in communication with means 36 that may also be of the microcomputer or portable computer type, and to which they will be able to transmit for example position data and/or measurement data. These means 34, 36 will be able to generate data tables or maps of the medium, identifying the contaminated zones.

The values of the different measured points may then be processed. They may for example be transferred onto a map. A file, for example an Excel file indicating the date, position (preferably with a precision for example of the order of one meter), the depth and radiological activity of the measured sediments may be generated, for example by the means 36, and recorded.

The values contained in this file may then be processed by software, for example of the "Kartotrack" type to produce a radiological map of the bed of the water, making use of the "kriging" principle (performing spatial interpolation of a regionalised variable by calculating the mathematical expectancy of a random variable, using interpolation and modelling of the experimental variogram).

It is thus possible to make measurements and a map of the bottom of an estuary or a storage pool on a nuclear site, or a river, or sedimentary retention zones (such as dams or locks, etc.).

This information can then be used to differentiate between contaminated and non-contaminated zones. Thus, for example, active sediments could be removed or water could be pumped from zones in the aqueous medium in which the ground is known to be not contaminated (for spraying on a fire).

A map giving information about the bottom of the aqueous medium can thus be produced to estimate the activity of the bottom of this aqueous medium.

Figure 3:
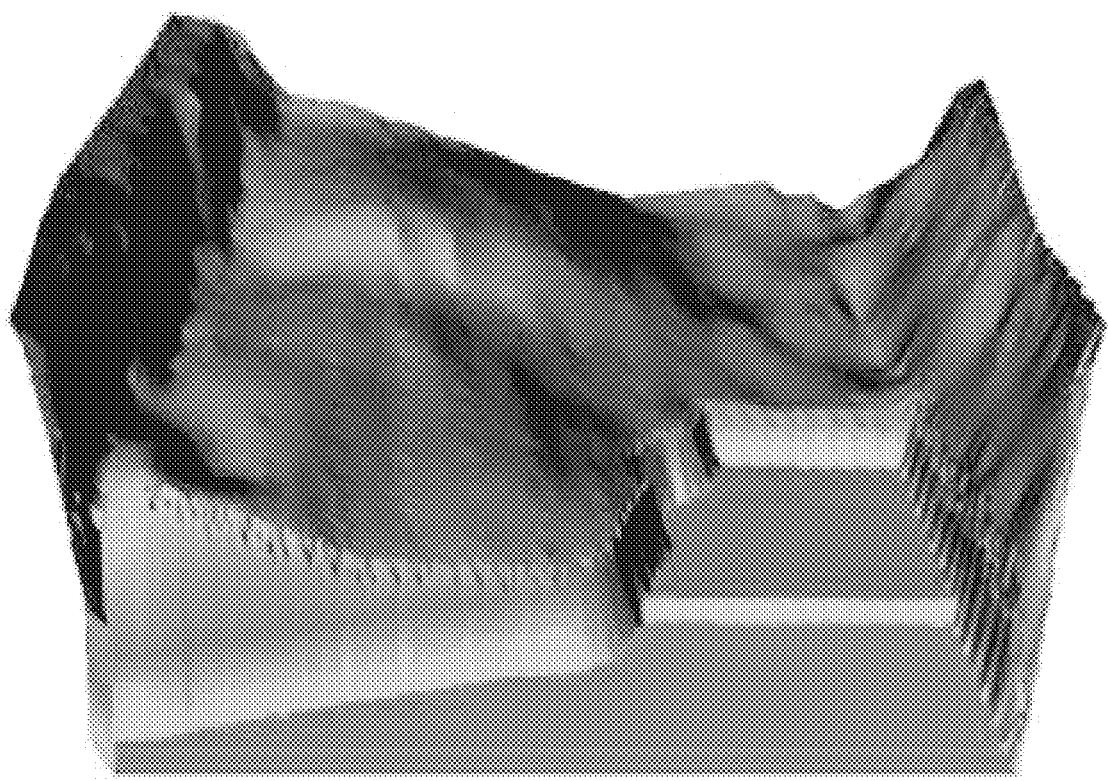
FIG. 3 is an example of a map obtained with a device according to the invention, FIGS. 4A and 4B diagrammatically show a probe introduced into an aqueous medium fitted with a cylinder (FIG. 4A) or an air cone (FIG. 4B)

FIG. 3 shows an example of a map obtained. The activity is lower in the paler zones in this figure, and higher in the darker zones.

We will now give a few examples of rounded signal calculations (genuine measured value)/noise (background noise induced by surrounding sediments) in a simple configuration showing the advantage of using an air cone.

The following calculation assumptions are made:
Sediments such as sand ($SiO_2$) with a density of 1.1 $g\cdot cm^{-3}$ are considered as the measurement source.
This source is 10 cm thick.
The detector selected for the measurements has following dimensions: it is straight cylinder of 3"×3" (76 mm×76 mm).
Consider an intrinsic efficiency of about 0.1 $c\cdot s^{-1}/\gamma\cdot s^{-1}$, which is a fairly severe assumption.
The radionuclide considered is $^{137}$Cs. The activity per unit volume of the source is about 10 $Bq\cdot cm^{-3}$.
We will consider an immersed detector and a water thickness (x) between the lower base of the air cylinder and the bed. The bed is contaminated over a thickness of 10 cm and it may be considered as an infinite surface.

Example 1

Figure 4A:
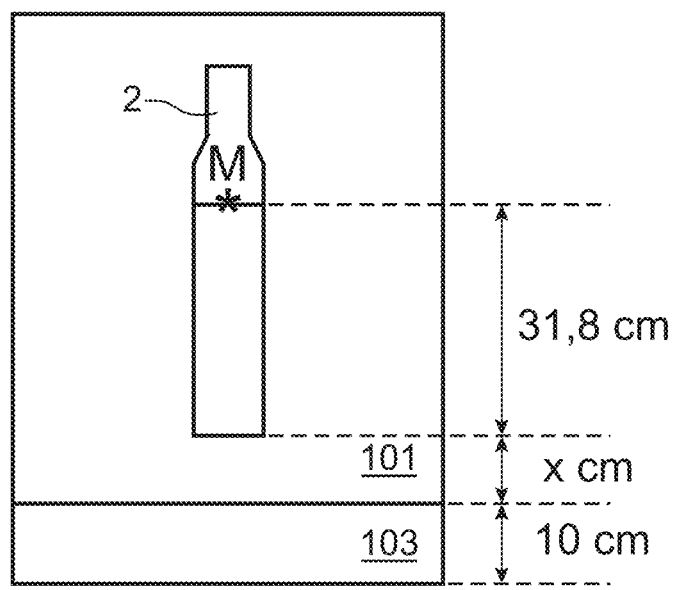
Figure 4B:
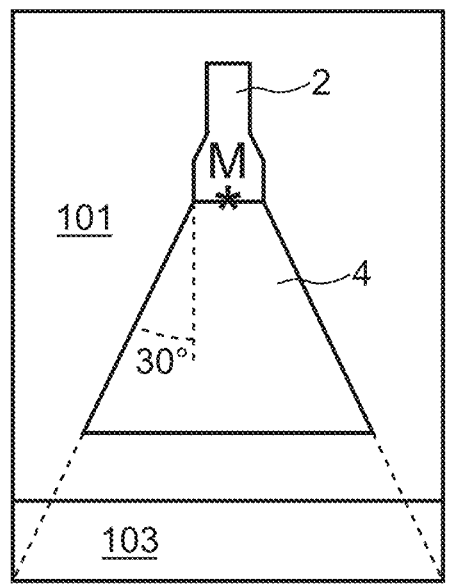

This example is shown in FIG. 4A. The detector is extended by a 15" (about 38.1 cm) high air cylinder. In this configuration, the target ground area is 45 cm².

If the fluence at point M located at the centre of the detector input face is calculated, it is found that the 45 cm² source seen under the detector outputs a signal 3 to 4 times higher than the signal output by surrounding sediments attenuated by water. Therefore, the signal-to-noise ratio is relatively poor. A comparison between values of the signal and the detection limit for a given measurement distance shows that making measurements using an air cylinder would not be very useful in the context of homogeneous ground contamination.

Example 2

The calculations presented above are repeated but with insertion of an air cone 4 under the detector instead of the cylinder in example 1. This example 2 is shown in FIG. 4B. The cone angle is 60 degrees. In comparison with the previous case, the cone inlet surface, in other words its base, is multiplied by a factor of about 100 in the case of a "sighting" under equivalent conditions.

The signal/noise ratio then varies between 30 and 40. The measurement obtained with insertion of the collimator or the cone 4 can therefore be considered as giving a very good estimate of the activity of the ground portion placed in the projection of the sighting cone, the remainder of the contaminated ground surface not having very much impact on the measurement. The infinite source assumption assures that this conclusion will be valid regardless of the configuration actually encountered.

Under such conditions, the detection limit expressed in terms of the activity per unit volume would be between 0.2 and 0.3 Bq·cm$^{-3}$ deposited in a truncated cone, the base area of which is defined above, within an environment uniformly contaminated at 10 Bq·cm$^{-3}$.

Figure 5A:
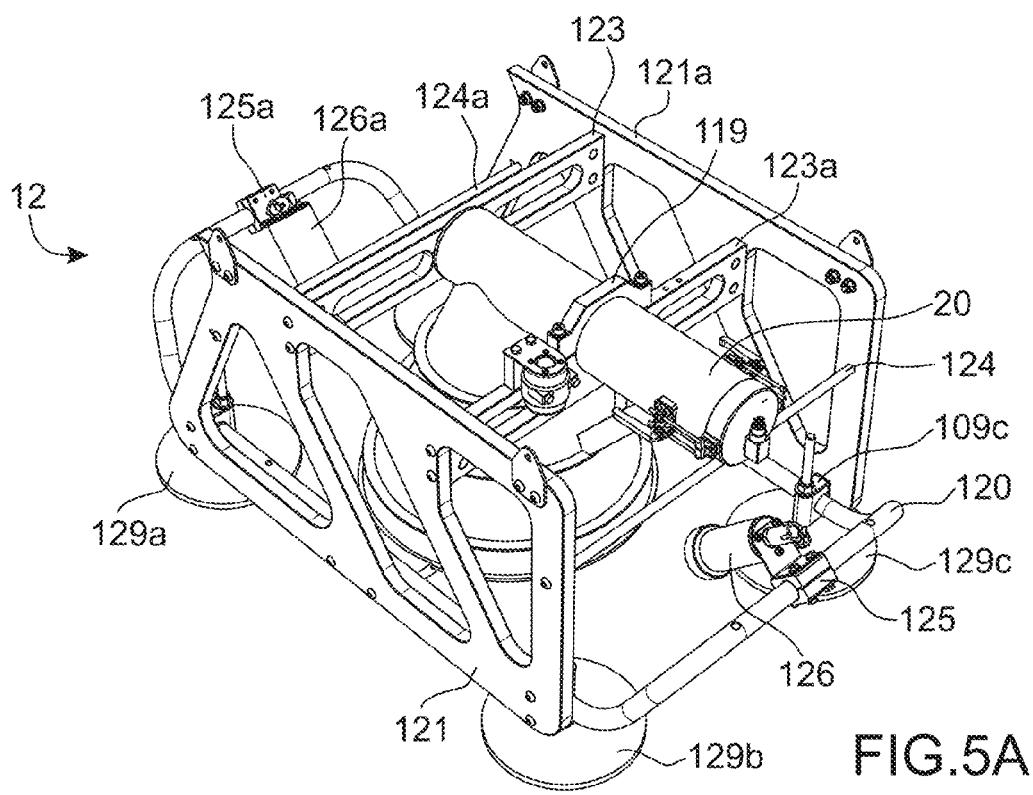
FIGS. 5A and 5B show an embodiment of a frame for a system according to the invention.
Figure 5B:
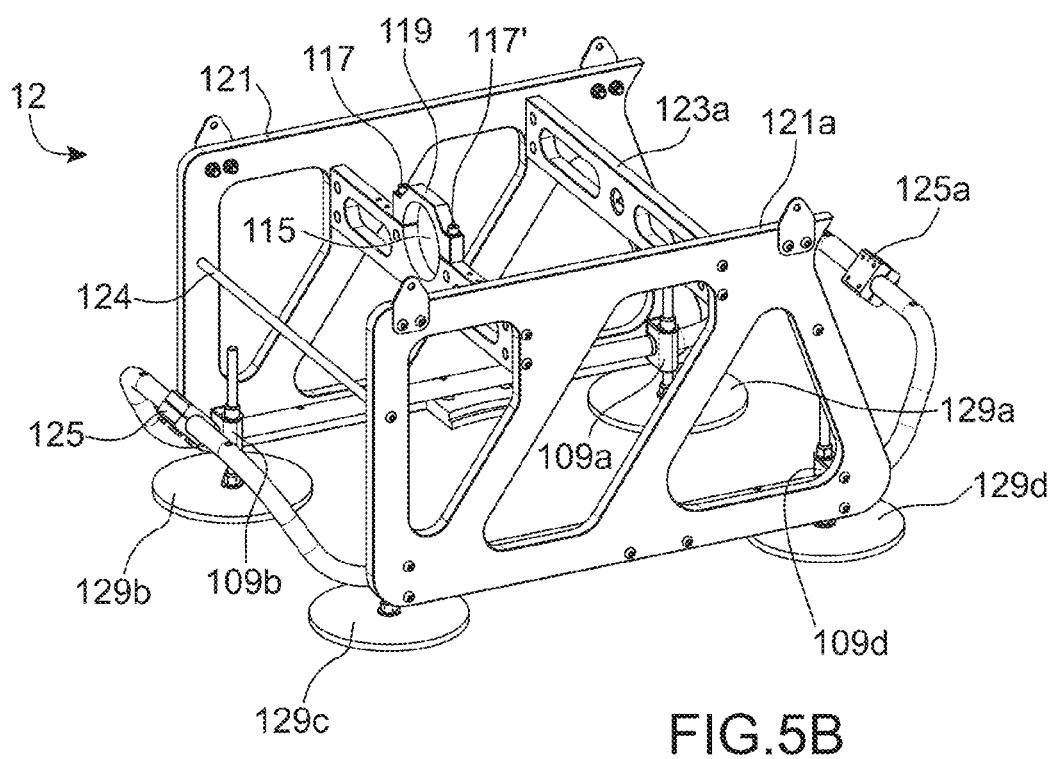

An example embodiment of the frame 12 is shown in FIGS. 5A and 5B.

In FIG. 5A, the frame is fitted with the detection assembly comprising the detector 2 and the observation cone 4. FIG. 5B shows the frame alone, without the detection means.

In these two figures, the reference 120 denotes a tubular frame with an approximately rectangular shape seen from above, but for which the ends of the large sides are curved, such that the small sides in a horizontal position of the device are at an elevation greater than the portions of the tube defining the large sides. This tubular frame is provided with preferably perforated side walls 121, 121a, along its two large sides, held in position relative to each other by means of cross pieces 123, 123a and bars 124, 124a. The cross pieces may advantageously be used to keep the measurement device itself in place. Thus, FIG. 5A shows that the case that contains the detector 2 bears on one of the cross pieces 123 inside which there is a semi-circular opening 115 to hold it. It is held in position in contact with this cross piece by means of a flange 119, that itself defines a semi-circular opening and is held in place in a fixed position in contact with the cross piece 123 by means of appropriate screwing means 117, 117'. One end of the case may be fixed in contact with the cross piece 123a. The small sides of the tubular frame 120 may be fitted with means 125, 125a forming a support for one or several devices 126, 126a such as one or several cameras and/or one or several spotlights. The remote controlled vehicle used to displace the frame may be fitted with an umbilical cable that in particular allows electrical power supply to these devices 126, 126a and exchanges of data output from the detector 2 and other devices, with means 34 (FIG. 2) located on the surface. The frame assembly is supported on stands 129a-129d so that the frame can be placed on a horizontal surface. Each of these stands, preferably adjustable in height, may be connected to the tubular frame 120 through means 109a-109d forming shock absorbers, to enable damped stabilisation of the entire system when it is brought into position in contact with a horizontal surface.

Connecting plates 135a-135d may be fixed in the upper part of the side walls, so that an upper element such as the ROV can be fixed as described later with reference to FIGS. 8A-8B.

Figure 6A:
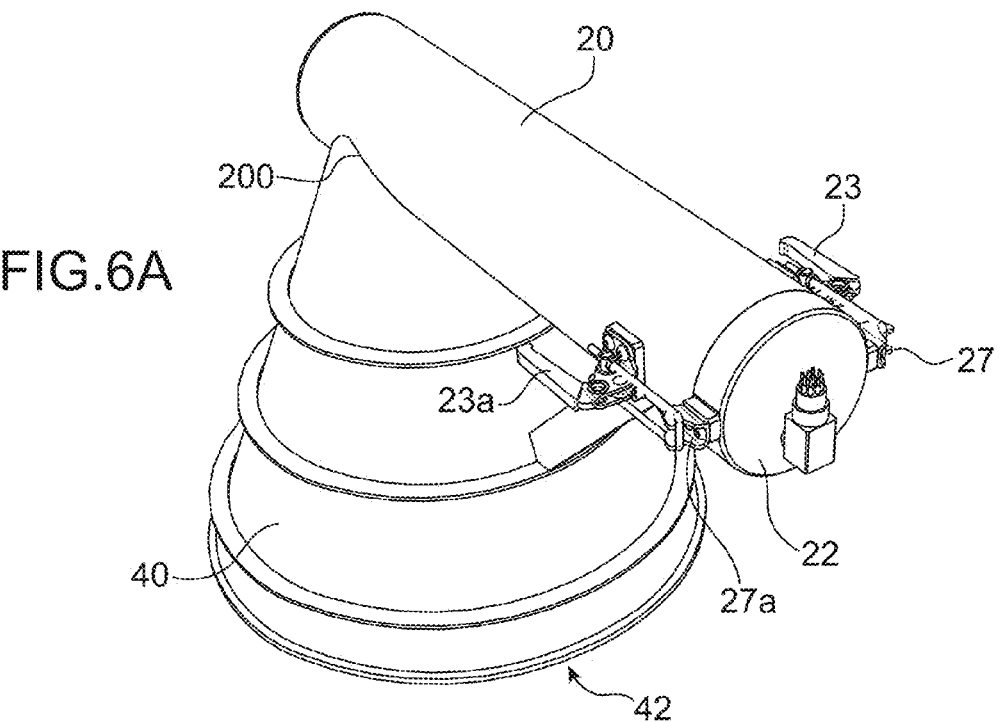
FIGS. 6A and 6B show perspective and sectional views respectively of a measurement device according to the invention.
Figure 6B:
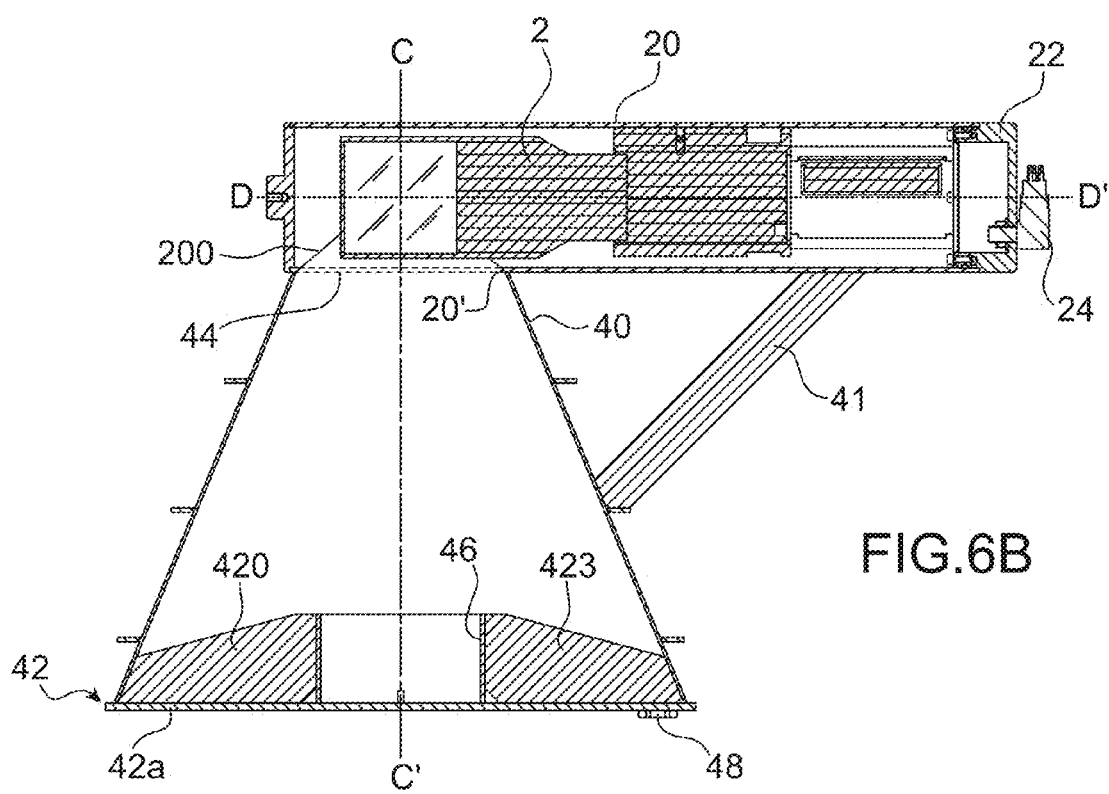

FIGS. 6A and 6B are perspective and longitudinal sectional views respectively showing the assembly comprising the case 20 that will contain the detector itself. This case is cylindrical or approximately cylindrical in shape; it also comprises a side opening 20' that will enable a sensitive area of the detector to capture the radiation to be measured.

The case 20 is associated with a truncated cone 40 at one of its ends that will be used as a collimator for the radiation to be measured. This truncated cone has a long base 42 and a short base 44 (the short base being symbolised by a discontinuous line in FIG. 6B). The long base is hermetically sealed by a plate 42a, of which an embodiment is described in detail below. The short base is open so as to communicate with the inside of the case 20 through the side opening 20' of the case. The diameter of this side opening 20' is approximately equal to the diameter of the short base 44.

As already mentioned above, the dimension of the short base of the truncated cone is preferably calculated such that the entire detector is in direct view of the source.

Information about the distance that can be chosen between the detector and the short base of the cone is also given above, this information being applicable particularly for this embodiment.

The detector 2 may be inserted in the case 20 through one of its removable ends 22, which is then closed and held in this position by means 23, 23a, 27, 27a, for example draw latches type closers. Reference 24 denotes electrical connection means to connect the detector to data reception, storage and processing means, for example located on the surface or on a boat.

Preferably, the case 20 and the cone 40 are welded to each other in a zone 200 defined in space by the intersection of the truncated cone 40 and the case 20, such that the opening formed by the short base 44 communicates with the side opening 20' of the case. A connecting bar 41 may possibly be provided to reinforce the assembly and to connect the other end of the case 20 and a bottom or median part of the cone 40.

The assembly forming the case 20 and the cone 40 is sealed, the seal being provided for example by means of double O-rings.

It can be seen that the longitudinal axis of the case 20 and the detector 2 is approximately perpendicular to the axis of revolution CC' of the truncated cone.

The detector may be shaped like a straight cylinder. In any case, the detector is preferably completely surrounded by the extension of the truncated cone (particularly in the cone part that extends to the truncated cone); in particular, according to one example embodiment, the detector face that is parallel to the short base 44 and the face that is perpendicular to the short base are contained in the extension of the truncated cone.

Figure 7:
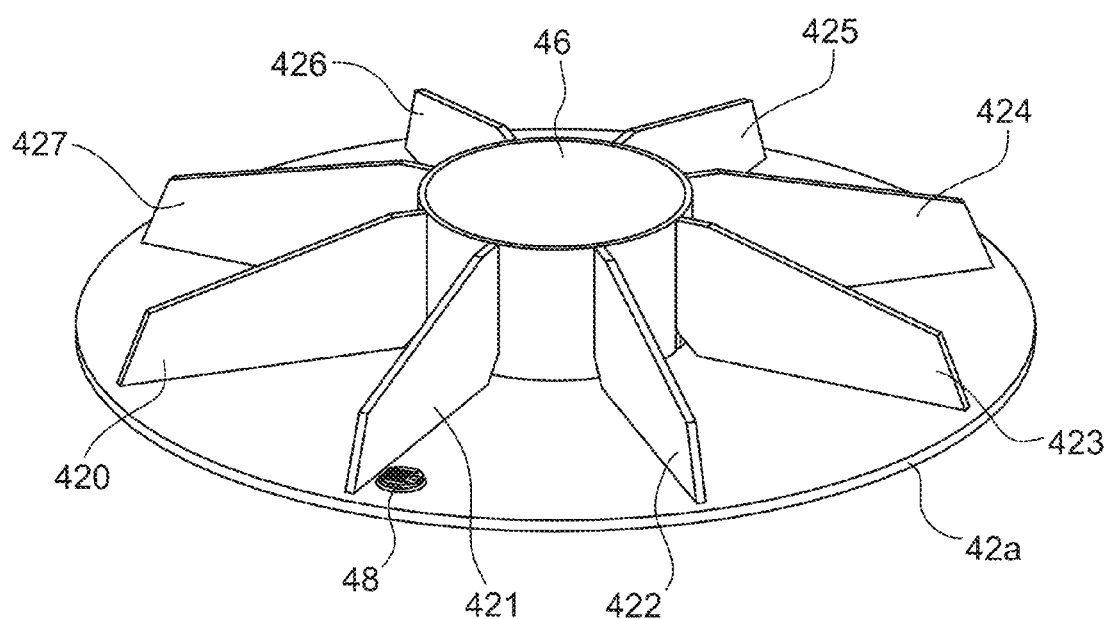
FIG. 7 shows the long base of a truncated cone used in a device according to the invention.

The plate 42a that closes the long base 42 of the truncated cone 40 can be seen in the lower part of FIG. 6B and in FIG. 7. The cone is welded to this plate and pressure is applied to it as a function of the depth for which it is designed. This plate is circular in shape and is fitted with ribs which, as already described above, reinforce the resistance of the plate 42a to pressure and keep its thickness to a value compatible with the measurement made. The cone is preferably made of stainless steel. The plate 42a may also be fitted with a means 48 forming a water sensor. A cylinder or a tubular portion 46 arranged approximately perpendicular to the long base stiffens the assembly by limiting the number of welds at a given point.

According to one example embodiment, the diameter of the case 20 is about 8.5 cm, its length is about 50 cm while the diameter of the long base 42 is about 38 cm, the diameter of the short base 44 is about 10 cm, and the distance between this long base and the DD' axis is about 34 cm.

FIGS. 8A and 8B show an example embodiment of the assembly comprising the ROV and the frame. The ROV 13 comprises side walls 131, 131a that are approximately the same shape as the walls 121, 121a of the frame already described. In particular, perforations are preferably formed in the walls 131, 131a.

This upper part is covered by a lid 11 and may contain illumination means 132, 133, an electric and/or hydraulic motor 16, and one or several motors 137, 139.

The ROV 13 may be connected to the lower frame 12 by the connecting plates 135a-135d already mentioned above. These plates are fixed firstly to the side walls of the lower frame and secondly to the side walls of the ROV.

According to one preferred embodiment, a device according to the invention can be used for non-isotropic detection, since it is directed towards the sea bed. In this case, no detection is made around the periphery or the entire periphery of the entire device, or no detection is made along a direction not directed towards the sea bed.

The invention claimed is:

1. Device for measurement of the radiological activity in the bottom of an aqueous medium, comprising a sealed case for a radiological detector, means forming a truncated cone with a closed volume, containing a material that allows radiation to be measured by said radiological detector to pass through it, comprising a short base and a long base, the long base forming an input face for the radiation to be measured, this cone being assembled to said case in a sealed manner, the short base being placed on the side of the case, and the long base being designed to be placed facing the bottom of the aqueous medium, said closed volume being sealed and operable to displace said aqueous medium when immersed therein.

2. Device according to claim 1, said material being a gas or a low density solid material that traps said gas.

3. Device according to claim 2, the solid material having a density less than 0.1 g·cm$^{-3}$.

4. Device according to claim 1, the long base of the truncated cone being closed by a plate comprising a central portion delimited by a tubular portion, arranged approximately perpendicular to the long base, and ribs extending radially connecting the tubular portion and said plate.

5. Device according to claim 1, the angle of the truncated cone being between 15° and 75.

6. Device according to claim 5, the angle of the truncated cone being on the order of 60°.

7. Device according to claim 1, the case extending along an axis approximately perpendicular to the axis of revolution of the truncated cone.

8. System for measurement of the radiological activity at the bottom of an aqueous medium comprising:
a frame for immersion in an aqueous medium,
a measurement device supported by said frame and comprising a sealed case for a radiological detector, means forming a truncated cone with a closed volume for containing a material that allows radiation to be measured by said radiological detector by passing through it, a short base and a long base, the long base forming an input face for the radiation to be measured, the cone being assembled to said case in a sealed manner, the short base being placed on the side of the detector input face case, and the long base being designed to be placed facing the bottom of the aqueous medium, said closed volume being sealed and operable to displace said aqueous medium when immersed therein.

9. System according to claim 8, also comprising at least one spotlight means of illuminating the aqueous medium and the bottom of this aqueous medium.

10. System according to claim 8, the frame-comprising perforated side walls.

11. System according to claim 8, the frame comprising at least one flange removably fixing the measurement device relative to the frame.

12. System according to claim 8, also comprising an underwater positioning system of the frame relative to the bottom of the aqueous medium.

13. System according to claim 8, also comprising a computer to produce a map of the radiological activity of the bottom of this aqueous medium.

14. System according to claim 8, also comprising at least one camera to film the aqueous medium and the bottom of this aqueous medium.

15. System according to claim 8, also comprising at least one motor displacing the measurement device relative to the frame.

16. System according to claim 8, also comprising a remote-controlled vehicle.

17. System according to claim 8, the frame also comprising to position the system on the bottom of the aqueous medium.

18. Method of measuring the radiological activity in the bottom of an aqueous medium, comprising:
introducing a device into the aqueous medium, the device having a sealed case for a radiological detector, means forming a truncated cone with a closed volume for containing a material that allows radiation to be measured by said radiological detector by passing through it, a short base and a long base, the long base forming an input face for the radiation to be measured, and the long base being adapted to be placed facing the bottom of the aqueous medium, said closed volume being sealed and operable to displace said aqueous medium when immersed therein;
measuring the radiological activity using the measurement device, with the long base of the truncated cone being brought close to the bottom of the aqueous medium.

19. Method according to claim 18, also comprising the production of a map of the radiological activity of the bottom of the aqueous medium.

20. Method according to claim 18, the aqueous medium being a lake, a sea or a river, or an estuary, or a storage pool on a nuclear site, or a sedimentary retention zone.

* * * * *